United States Patent Office 3,302,174
Patented Jan. 31, 1967

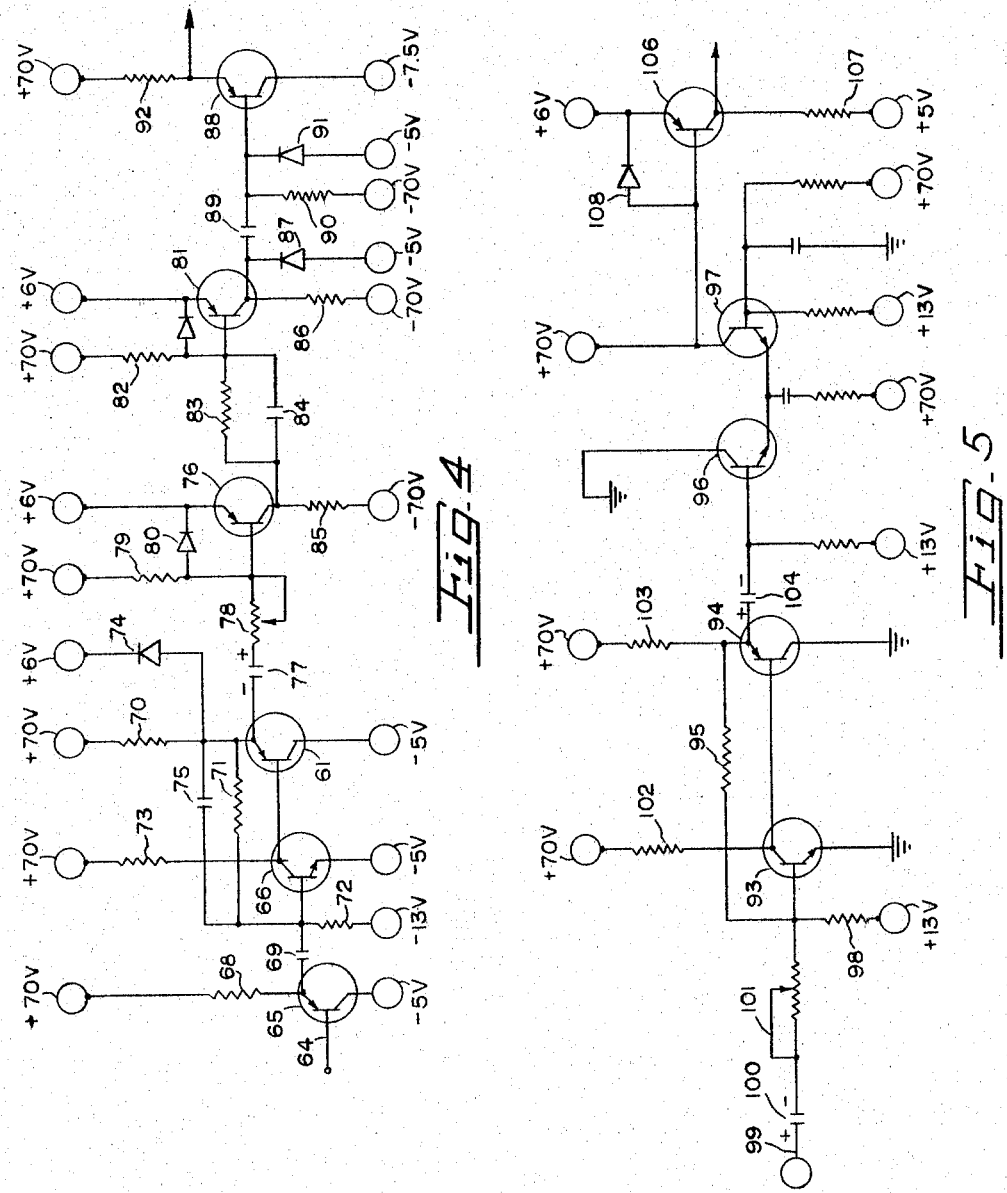

3,302,174
SIGNAL POSITION DETECTION CIRCUIT
Constantine Djinis, Johnson City, N.Y., and Leland J. Hanchett and Charles L. Hart, Phoenix, Ariz., assignors to General Electric Company, a corporation of New York
Filed July 30, 1963, Ser. No. 298,640
5 Claims. (Cl. 340—146.3)

This invention relates to a system for detecting the presence of a signal having predetermined amplitude and waveshape characteristics. More particularly, the present invention relates to a circuit for detecting the leading portion of each waveshape of a system of waveshapes to be recognized.

A U.S. Patent No. 2,924,812 by P. E. Merritt et al. entitled "Automatic Reading System," which is assigned to the same assignee as the present invention, describes and claims an arrangement whereby human language may be converted into machine language by, for example, printing the human language symbols in ink which is capable of being magnetized, passing these symbols in sequence past a magnetic transducer for generating electrical signals having a distinctive waveshape for each symbol, and recognizing the distinctive waveshapes by providing a plurality of recognition networks, one for each of the waveshapes to be recognized.

The recognition networks receive input signals from a plurality of sampling taps provided on a delay line. The delay line serves as a temporary storage device for each waveshape generated by the magnetic transducer whereby a plurality of points along the waveshape, corresponding to the sampling taps, may be sampled simultaneously.

For proper interpretation of the signals from the recognition networks, these signals are sampled only when the waveshape has reached a predetermined position in the delay line. Thus means are required for determining when the waveshape has reached this predetermined position.

In the prior art, the determination that the waveshape has reached the sampling position has been accomplished by detecting the amplitude of the signal in the delay line at selected ones of the sampling taps. The rationale of this type of presence detection is founded on the fact that a properly printed magnetic ink symbol presents a certain minimum amount of magnetic material as the leading edge of the symbol passes the transducer. Hence the transducer will generate a signal of a certain minimum amplitude in response to the leading edge of the symbol. The signals at the selected sampling taps are detected by a circuit which is responsive to signals greater than a preselected minimum amplitude, a suitable circuit for this purpose being the well-known Schmidt trigger circuit. The Schmidt trigger circuit may then initiate the generation of a set of timing signals for sampling signals from the recognition networks at the proper time.

Such methods for detection of the presence of a waveshape in the delay line assume that only a magnetic symbol will cause the transducer to generate a signal having an amplitude sufficient to exceed the threshold of the Schmidt trigger circuit.

It has been found that random spatters of magnetic ink on the document and stray iron particles embedded in the document can cause the transducer to generate a signal having an amplitude sufficient to exceed the threshold of the Schmidt trigger circuit whereby the generation of the timing signals is erroneously initiated. As a result the waveshape is not sampled at the proper time.

It is therefore a primary object of the invention to distinguish symbol signal waveshapes from random signal waveshapes.

It is another object of the invention to provide an improved waveshape presence detection system.

It is a further object of the invention to distinguish between waveshapes characteristic of magnetic symbols and waveshapes characteristic of random magnetic particles.

These and other objects of the invention are accomplished according to the illustrated embodiment of the invention by sampling at two sampling taps of the delay line which receives each waveshape. A peak detector circuit is coupled to a first sampling tap and a threshold circuit is coupled to a second sampling tap located further along the delay line in the direction of propagation of the waveshape. The peak detector circuit generates a signal when the first peak of a symbol waveshape is encountered. The threshold circuit generates a signal of fixed amplitude when the signal received from the second tap exceeds the amplitude of a reference signal of predetermined amplitude. The output signals from the peak detector circuit and the threshold circuit are applied to a logical AND circuit and the output signal from the AND circuit causes the generation of a waveshape presence signal which in turn is employed to initiate generation of timing signals which control the sampling of the output signals from the symbol recognition circuits.

It is arranged that the peak detector and threshold circuits respond only to signals from waveshape peaks characteristic of the first peak of each waveshape of the plurality of waveshapes to be recognized. In general, the peaks or antinodes of waveshapes of signals from random particles will not have the amplitude necessary to actuate the threshold circuit and the shape characteristic necessary to actuate the peak detector circuit in a time relationship similar to one of the desired waveshapes. In other words, it is unlikely that a random particle will cause simultaneous output signals from the peak detector and a threshold circuit. Thus the waveshape presence detection system of the invention substantially prevents the generation of timing signals in response to signals from random particles or other noise signals.

The features of novelty that are considered characteristic of the invention are set forth with particularity in the appended claims. The organization and method of operation of the invention itself will be understood from the following description when read in connection with the accompanying drawings in which:

FIGURE 4 is a circuit diagram of a peak detector circuit of the differentiating type which may be used in the present invention; and FIGURE 5 is a circuit diagram of a threshold circuit of the reference level comparison type which may be used in the present invention.

Figure 1:
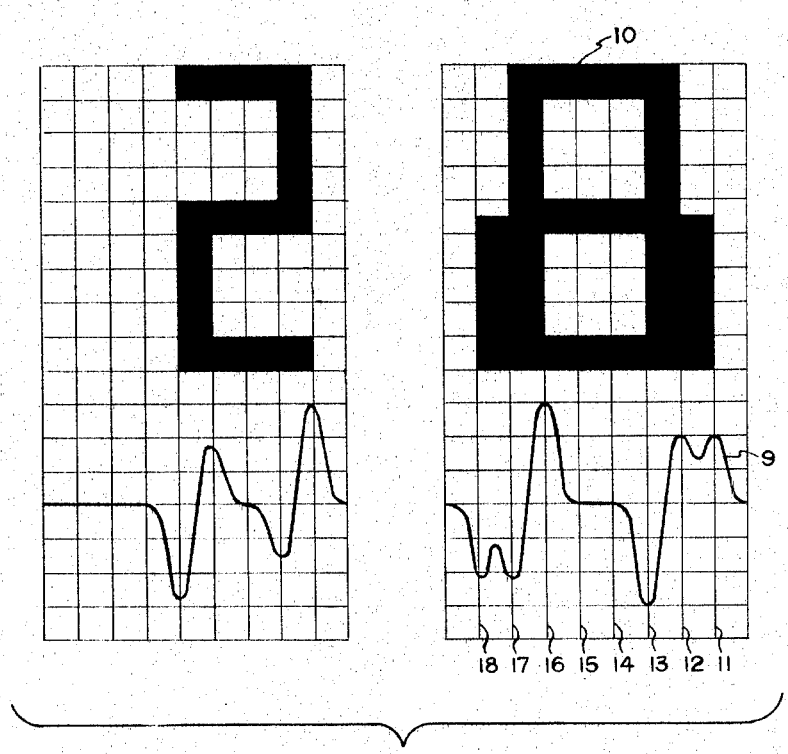
FIGURE 1 is an illustration of two examples of human language symbols adapted to be recognized by the symbol reading system utilizing the present invention.

Referring to FIG. 1, the decimal numeral "8," identified by the reference numeral 10, is a representative symbol of a system of the human language symbols whose waveshape presence is detected by the present invention. (A complete system of symbols is shown in copending U.S. patent application S.N. 770,862, entitled "Apparatus for Reading Human Language," filed October 30, 1958 by R. E. Milford and assigned to the same assignee as the present invention.) Symbol 10 comprises a substantially continuous area of magnetizable material imprinted on the surface of a suitable symbol bearing material. A suitable magnetic material, which is visible to the human eye, is disclosed in copending U.S. patent application S.N. 486,985 by C. B. Clark, entitled Magnetic Ink, filed February 8, 1955, which is assigned to the same assignee as the present invention.

Symbol 10 is designed to conform with an imaginary grid of parallel vertical boundary lines 11–18. Boundary lines 11–18, in FIG. 1 are numbered from right to left in accordance with the direction which the symbol 10 is scanned. Thus the symbol 10 may be considered to be formed of a set of areas of magnetizable material, an area comprising the total extent or amount of magnetic material imprinted between two successive imaginary boundary lines. The extent of magnetic material of an area of the symbol 10 is constant between any two successive boundary lines. The extent of magnetic material changes abruptly, if it changes at all, only at one of the boundary lines.

Figure 2:
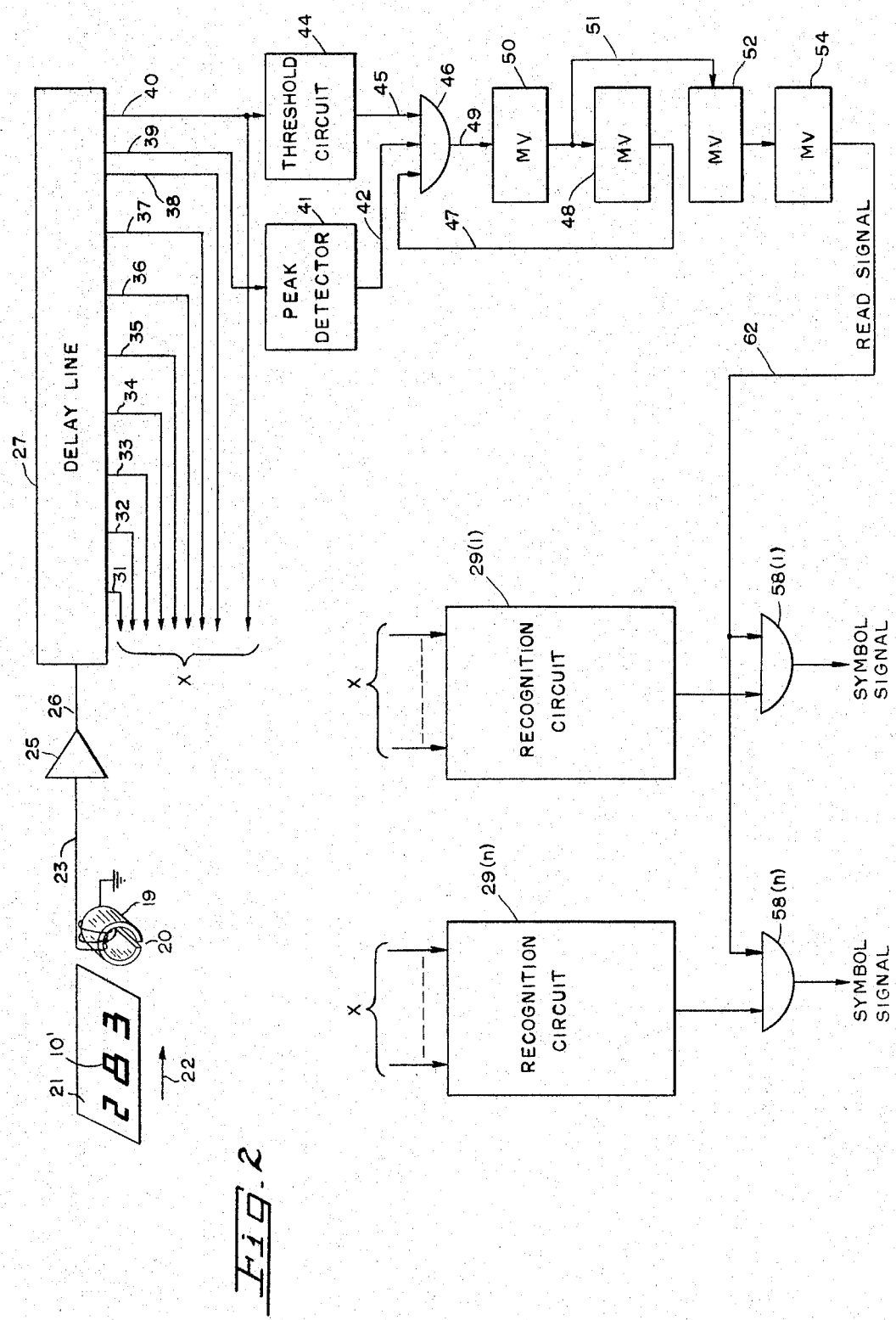
FIGURE 2 is a diagrammatic illustration of a system for reading human language symbols incorporating the waveshape presence detection circuit of the present invention.

A transducer 19, illustrated in FIG. 2, most suitable for use with symbol 10 and other symbols imprinted with magnetic material is one responsive to the rate of change of magnetic flux linking a transducer gap 20. The transducer 19 scans the symbol 10 from right to left and experiences the following unit changes in extent of magnetic material passing by the gap: at boundary line 11, +4½; at boundary line 12, +4½; at boundary line 13, −6; at boundary line 14, 0; at boundary line 15, 0; at boundary line 16, +6; at boundary line 17, −4½; and at boundary line 18, −4½. As a result of these changes in extent of magnetic material a waveshape 9 is produced.

The waveshape generated by the transducer 19 in scanning any symbol of the system of symbols to be recognized will always have a positive going wave front as a result of scanning the right-hand edge of the symbol. After encountering the right-hand edge or boundary line 11 of the symbol 10, the extent of magnetic material scanned by the gap 20 does not change until the boundary line 12 is encountered. Since the transducer is responsive to only a change in extent of magnetic material passing by its gap 20, the wave form will reach a peak or antinode and begin to decrease toward a zero value some time after the gap 20 encounters the symbol's leading edge but before boundary line 12 is encountered. The rise in voltage plus the change in the rate of rise (approach of the peak of the waveshape) are utilized in the present invention to detect the presence of a waveshape.

Considering now the operation of the system of FIG. 2, a document 21 bearing symbols such as a symbol 10′, printed with magnetic material, is moved with respect to a transducer 19 in a rightward direction (by means not shown) as indicated by arrow 22. The gap 20 of the transducer is oriented parallel to the imaginary boundary lines 11–18 (FIG. 1) of the symbols to be scanned. In response to a printed symbol, a corresponding waveshape is generated by transducer 19 and is transmitted over a lead 23 to an amplifier 25. Transducer 19 is responsive to the rate-of-change of magnetic flux coupled with gap 20 by the previously magnetized symbol. Thus the transducer produces a waveshape having a peak or antinode corresponding to each change in the extent of magnetic material of the scanned symbol. The amplified waveshape from amplifier 25 is delivered on a lead 26 to a wave transmission means shown as a delay line 27.

A series of waveshape sampling taps 31–38 and 40 are positioned at spaced apart locations along the delay line to provide samples of the waveshape voltage at corresponding points. A special sampling tap 39 is positioned between taps 38 and 40 to provide a signal for the waveshape presence detector circuit of the invention. Sampling tap 39 is spaced apart from tap 40 such that a predetermined time is required for a signal in the delay line to travel from tap 39 to tap 40. The predetermined time is choosen to be the time normally required for the beginning of a symbol waveshape to move from a position whereat the leading portion of the waveshape is of a predetermined amplitude to the position of the first peak of the waveshape.

As a waveshape propagates down the delay line, it is sensed first at the sampling tap 39 and then at the sampling tap 40. The signals from taps 39 and 40 are applied to the waveshape presence detection circuit of the invention which comprises a peak detector circuit 41, a threshold circuit 44, an AND gate 46, a first multistable multivibrator 50 and a second multistable multivibrator 48. The peak detector circuit 41, connected to sampling tap 39, provides an output signal on an output lead 42 when the peak of any positively rising voltage is reached, that is, when the slope of the positive going portion becomes substantially zero. (A suitable embodiment of a peak detector circuit is described in detail hereinafter.)

The sampling tap 40 is connected to the threshold circuit 44 which produces a signal on an output lead 45 only when the signal from sampling tap 49 is above a predetermined amplitude. (A suitable embodiment of a threshold circuit is described in detail hereinafter.)

An output lead 42 of the peak detector circuit 41, and an output lead 45 of the threshold circuit 44 are connected to respective input terminals of the well-known three-input AND gate 46. The AND gate 46 is of a type which produces an output signal on its output lead 49 only upon concurrence of input signals at each of its input terminals. An output lead 47 of the well-known monostable multivibrator 48 (more commonly known as a one-shot) is connected to the other terminal of the AND gate 46.

It is arranged, as described hereinafter, that the one-shot 48 produces a signal to enable gate 46 only once during the propagation of each waveshape through the delay line 27 whereby only one set of timing signals is generated for each waveshape. Thus the gate 46 produces an output signal upon the simultaneous receipt of signals from the peak detector circuit 41, the threshold circuit 44 and the one-shot 48.

The lead 49 from gate 46 is connected to the input terminal of the well-known monostable multivibrator or one-shot 50. This one-shot is triggered to its astable state by a signal from gate 49 and thereupon produces a signal on an output lead 51. The output lead 51 is connected to an input terminal of one-shot 48 and to an input terminal of a monostable multivibrator or one-shot 52.

As employed in the present circuit, the monostable multivibrator or one-shot 48 provides an enabling signal to gate 46 over lead 47 when it is in its stable state and provides a disabling signal to gate 46 when it is triggered to its astable state by a signal from one-shot 50.

How the detector circuit distinguishes waveshapes of signals from random particles from waveshapes of signals from symbols is best illustrated by reference to FIG. 3 which shows a representative leading portion A of a symbol waveshape and the leading portions B and C of two representative waveshapes of signals from random particles together with a graph of the signals produced by the circuit in response to these waveshapes.

Figure 3:
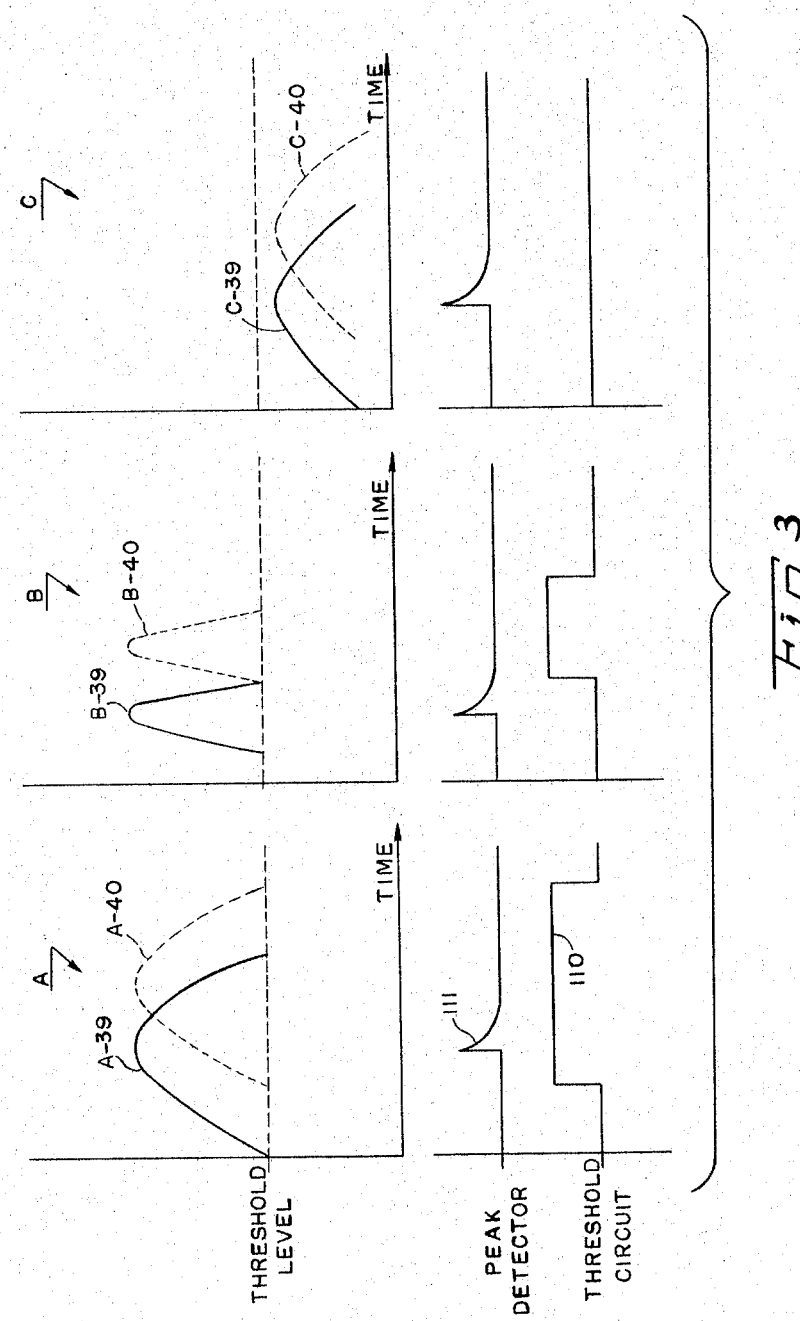
FIGURE 3 is an illustration of portions of several waveshapes together with timing diagrams useful in explaining the operation of the present invention.

As shown in FIG. 3 the portion of a symbol waveshape legended A–39 represents the first or leading peak of a symbol waveshape (such as waveshape 9, FIG. 1) as sampled at the sampling tap 39 to which the peak detector 41 is connected. The dashed curve A–40 is the same portion of the symbol waveshape as sampled at sampling tap 40 to which the threshold detector 44 is connected. Thus as shown in FIG. 3, the illustrated waveshapes A, B and C are propagating rightward in the delay line.

When the leading portion of the waveshape A exceeds the threshold level at sampling tap 40 the threshold circuit 44 produces an output signal 110 as shown in FIG. 3. And when the leading peak of the waveshape reaches the sampling tap 39 the peak detector produces a pulse 111. Thus in the case of the symbol waveshape A the output signals from the peak detector and threshold circuit coincide in time.

It will be recalled that the one-shot 48 is normally in its stable state and that in this state it produces an enabling signal over lead 47 to the AND gate 46. Thus upon the simultaneous occurrence of the signals 110 and 111, along with the enabling signal from one-shot 48, the AND gate 46 produces a signal on lead 49 which triggers the one-shot 50. The one-shot 50 thereupon produces a waveshape presence signal on lead 51 which initiates the generation of timing signals and which triggers the one-shot 48 to its astable state. The signal on lead 47 when the one-shot 48 is in its astable state disables the AND gate 46 to prevent subsequent portions of the waveshape from actuating the presence detection circuit. Thus the period of the astable state of one-shot 48 is adjusted to be equal to or slightly greater than the time of propagation of a symbol waveshape through the delay line.

The waveshape B in FIG. 3 has a narrow leading peak as may be caused, for example, by a relatively small extraneous magnetic particle of high magnetic strength. The solid curve B-39 represents the waveshape as sampled at sampling tap 39 while the dashed curve B-40 represents the same waveshape as sampled at sampling tap 40. It is noted that in this case the signals from the peak detector and threshold circuit do not coincide in time. Therefore the gate 46 is not enabled and thus the presence detection circuit does not respond to this waveshape.

The waveshape C of FIG. 4 has a broad low peak as may be caused, for example, by a relatively large magnetic ink spatter of low density. As shown in FIG. 3, the amplitude of the waveshape C does not exceed the threshold level of the threshold circuit 44. Thus this circuit does not provide an enabling signal to the AND gate 46. Thus response of the presence detection circuit to a waveshape such as waveshape C is prevented.

Thus what has been described is a waveshape presence detection circuit which provides a substantial improvement in performance over the presence detectors of the prior art. For example, replacement of prior art presence detectors with the circuit of the present invention typically results in less than one-half the previous number of rejected documents.

As previously mentioned, the waveshape presence signal on lead 51 from the one-shot 50, in addition to triggering the one-shot 48, initiates the generation of the recognition system timing signals. Details of a timing signal generation circuit and of the symbol waveshape recognition circuits will be found in the previously mentioned U.S. Patent No. 2,924,812.

Briefly, the timing signal generation circuit comprises a series of monostable multivibrators (or the equivalent) such as a pair of one-shots 52 and 54 which provide a suitable shaped and timed "read" signal on a lead 62. The read signal is applied to a plurality of AND gates 58(l)–58(n) in the symbol output signal leads from a corresponding plurality of waveshape recognition circuits 29(l)–29(n). In this manner the gates 58(l)–58(n) are enabled when the waveshape reaches a predetermined position in the delay line as is explained more fully in the previously mentioned U.S. Patent No. 2,924,812.

To complete the description of the waveshape presence detection circuit of the present invention, the following specific description of suitable circuits for the peak detector 41 and the threshold circuit 44 are given.

Shown in FIG. 4 is the circuit diagram of a peak detector of the differentiating type which may be used in the present invention for providing an output signal when the time rate of positive change in voltage at sampling tap 39 of the delay line 27 reaches a predetermined minimum value.

At left, in FIG. 4 there is shown a lead 64 connected to the base of a PNP transistor 65 which is an emitter follower providing a low input impedance to a differential amplifier comprised of transistors 66 and 67. Lead 64 is coupled to sampling tap 39 of the delay line 27 of FIG. 2. With no wave present in the delay line the signal furnished by lead 64 to the base of transistor 65 is approximately 0 volts or slightly positive. A positive source of direct current power is coupled to the emitter of transistor 65 through a resistor 68. The collector of transistor 65 is coupled directly to a negative source of direct current power. Transistor 65 is thus conducting and the emitter is at approximately the same voltage as the voltage at the base. A positive rise in voltage at the base of transistor 65 causes a corresponding rise in voltage of the emitter of transistor 65.

A coupling capacitor 69 connects the emitter of transistor 65 to the base of transistor 66. An increasing voltage at the emitter of transistor 65 is thus impressed across capacitor 69 to the base of transistor 66.

With no increasing voltage at the base of transistor 66 a voltage of approximately zero is impressed at the base of transistor 66 by means of a voltage divider comprised of resistors 70, 71 and 72 connected between a positive and negative source of direct current power. The collector NPN type transistor 66 is connected with a source of positive voltage direct current power through a resistor 73. The emitter of transistor 66 is connected directly with a source of negative direct current power. Transistor 66 is thus non-conducting and hence the voltage at its collector is approximately the voltage of its positive D.C. source.

The collector of transistor 66 is connected directly to the base of PNP transistor 67. Thus the base of the transistor 67 is at the same voltage as the collector of transistor 66.

The emitter of transistor 67 is connected to a source of positive direct current power through resistor 70. A diode 74 connected between the emitter of transistor 67 and a source of direct current power prevents the voltage of the connected emitter from rising above the voltage of the supply as will be more fully explained hereinafter. Transistor 67 is thus conducting and the voltage at its emitter is approximately zero volts.

Feedback from the emitter of transistor 67 to the base of transistor 66 is provided by an RC network comprising resistor 71 and capacitor 75. It is to be recalled that the voltage at the base of transistor 66 is normally at approximately zero volts. Hence there is no voltage drop or potential difference across the feedback network of resistor 71 and capacitor 75.

As the input voltage across capacitor 69 rises the voltage at the base of transistor 66 accordingly rises by the same amount. A rise in voltage at the base of transistor 66 causes a decrease in voltage at its collector. The decrease in collector voltage is transmitted to the base of transistor 67. A decrease in voltage at the base of transistor 67 causes its emitter voltage to correspondingly decrease.

The decrease in transistor 67's emitter voltage results in a voltage or potential difference across the RC network comprised of resistor 71 and capacitor 75. As the voltage of the base of transistor 66 rises and the voltage at the emitter of transistor 67 decreases the capacitor 75 is in a state of being charged. The change in voltage across capacitor 75 is exponential; that is, rate of change is proportional to time.

When sufficient time has elapsed to fully charge the capacitor 75 the voltage of the emitter of transistor 67, minus a voltage drop across resistor 71, is added to the voltage at the base of transistor 66. Since this feedback voltage is of a polarity opopsite to that of the input voltage, the transistor 67's collector voltage is increased thereby increasing the voltage at the emitter of transistor 67. This will in turn attempt to charge capacitor 75. After a time delay the increase in voltage will be impressed at the base of transistor 66 which will cause further increase in voltage at the emitter of transistor 67.

It is to be noted that the decrease in voltage at the base of transistor 66, as caused by feedback from the emitter of transistor 67, is of a polarity opposing rising voltage on capacitor 67 from the emitter of transistor 68. Thus the effective voltage at the base of transistor 66 is the difference between the voltages across the capacitor. The voltage at the base of transistor 66 will be returned to its normally zero voltage according to the charging time constant of capacitor 69 and capacitor 75.

The base of a PNP transistor 76, which serves as a switch, is coupled to the emitter of transistor 67 by means of series connected capacitor 77 and potentiometer 78. Positive direct current power is supplied to the base of transistor 76 through resistor 79. A source of positive direct current is connected to the emitter of transistor 76, the magnitude of the voltage supplied to the emitter being less than the value of the voltage of direct current supplied to the base.

A diode 80 connected directly between the base and emitter of transistor 76 assures that the voltage of the base does not rise above the voltage of the supply connected directly to the emitter. Normally, the voltage at the base of transistor 76 is +6 volts and therefore the transistor is non-conducting. The voltage at the collector of transistor 67 is approximately zero volts.

As the voltage at the emitter of transistor 67 decreases the capacitor 77 is discharged. As capacitor 77 discharges the voltage at the base of transistor 76 is accordingly decerased. The base of transistor 76 drops below the voltage of the emitter and thus the transistor conducts or is switched on.

The collector of transistor 76 is connected to a source of negative direct current power through a resistor 85. The voltage of the collector of transistor 67 is thus increased to the emitter voltage. As the voltage at the emitter of transistor 67 increases, a previously described, capacitor 77 begins to recharge. When the capacitor 77 is thus recharged the voltage at the base of transistor 76 is returned to its former value and the transistor ceases to conduct.

It is to be noted that the time rate of discharge of capacitor 77 is controlled by the value of the effective resistance between the capacitor and the base of transistor 76 as established by the particular setting of potentiometer 78.

The emitter of a transistor 81 is directly connected to a source of positive direct current power. The base of transistor 81 is connected to a source of positive direct current power through a resistor 82. The collector of transistor 76 is connected to the base of transistor 81 through a parallel connected RC network comprising resistor 83 and capacitor 84.

The collector of transistor 81 is connected to a source of negative direct current power through resistor 86. When transistor 76 is in its normally non-conducting state the negative voltage at its collector maintains a voltage on the base of transistor 81 that is negative with respect to the emitter of transistor 81. Hence transistor 81 is conducting and the voltage at its collector will be approximately equal to the emitter voltage.

When transistor 67 is turned on, the rise in voltage as its collector is impressed across resistor 83 to the base of transistor 81 thereby rendering transistor 81 nonconductive. Thus the voltage at the collector of transistor 81 is switched to the voltage furnished by the clamping diode 87. When the transistor 76 is once again turned off, the transistor 81 is once again turned on. Thus the voltage at the collector of transistor 81 rises or returns to the same voltage as the emitter voltage.

A PNP type transistor 88 has its base connected to the collector of transistor 81 by a signal transfer capacitor 89. A negative source of direct current power is connected to the base of transistor 88 through a resistor 90. By means of clamping diode 91, connected between a source of negative direct current power and the base of transistor 88, the voltage at the base is prevented from dropping below the clamping voltage. A source of positive direct current power is connected to the emitter of transistor 88 through a resistor 92. A voltage more negative than that applied to diode 91 is applied to the collector of transistor 88. The voltage at the emitter of transistor is thus normally at approximately zero volts.

When the voltage at the collector of transistor 81 drops, the diode 91 prevents the voltage at the base of transistor 88 from dropping. When the voltage from the collector of transistor 81 rises rapidly, as it is switched back to its conducting state, the rise in voltage is impressed across capacitor 89 and on the base of transistor 88. Since transistor 88 is an emitter follower the voltage at its emitter rises accordingly.

The voltage at the base of transistor 88 is quickly returned to its former low level by discharge of the capacitor 89 through resistor 90. The decrease in voltage at the base of transistor 88 is accompanied by a corresponding return of the voltage at its emitter to its former low value. The emitter of transistor 88 is the output point of the peak detector circuit. The emitter of the transistor 88 may be coupled directly to one input terminal of an AND-gate 46 as illustrated in FIG. 2.

There is illustrated in FIG. 5 a threshold circuit of the comparator type for comparing the value of the voltage of the signal present on sampling tap 40 of the delay line 27 of FIG. 2 with a fixed standard and for producing an output signal on lead 45 when the voltage from sampling tap 40 exceeds the fixed standard.

An amplifier comprising NPN transistor 93, PNP transistor 94 and feedback resistor 95 is provided to amplify the input signal to a value that may be utilized by a Schmidt trigger circuit comprising transistors 96 and 97.

A negative source of direct current power is connected to the base of transistor 93 through a resistor 98. The base of transistor 93 may be connected to the input signal source by means of an input lead 99 through series connected capacitor 100 and potentiometer 101. A source of positive direct current power is connected to the collector of transistor 93 through a resistor 102. The emitter of transistor 93 is grounded. The base of transistor 94 is connected directly to the collector of transistor 93. The emitter of transistor 94 is connected to a source of positive direct current power through a resistor 103. The collector of transistor 94 is grounded. Feedback resistor 95 is connected between the emitter of transistor 94 and the base of transistor 93.

With no input signal furnished on lead 99 the voltage at the base of transistor 93 is zero or slightly positive and the voltage at collector is at a positive value. The voltage at the emitter of transistor 94 is thus at a positive value.

As a positively rising signal is applied to the capacitor 100 from lead 99 the voltage at the base of transistor 93 is caused to rise accordingly. The voltage at the collector of transistor 93 is thus caused to become more negative, thereby decreasing the voltage at the emitter of transistor 94. Feedback resistor 95 applies a negative voltage to the base of transistor 93 thereby tending to maintain the base of transistor 93 at its former value.

When the input signal ceases to rise in the positive direction and decreases to its former value the voltage applied to the base of transistor 93 is accordingly decreased. This causes a corresponding increase in voltage at the collector of transistor 93 which in turn effects a corresponding increase in voltage at the emitter of transistor 94 which tends to maintain the base of transistor 93 at its former value. Thus the voltage at the emitter of transistor 94 is an amplified inverted representation of the voltage waveform at the input lead 99.

The base of transistor 96 is connected to the emitter of transistor 94 through a coupling capacitor 104. Transistor 96 is normally conducting when the voltage at its base is the voltage impressed by a negative source of direct current power through a resistor 105 plus the voltage impresed across capacitor 104 by transistor 94 when there is no input signal on lead 99. Thus the voltage at the emitter of transistor 96 and the emitter of transistor 97 is at a negative value lower in amplitude than the voltage at the base of transistor 97. Transistor 97 is thus not conducting and hence the voltage at its collector is at a positive value.

As the voltage at the emitter of transistor 94 drops there is a corresponding decrease in voltage across the capacitor 104 and thus the voltage at the base of transistor 96 is correspondingly lowered. When the voltage at the base of transistor 96 reaches a predetermined value the transistor 96 ceases to conduct thereby lowering the voltage at its emitter and the emitter of transistor 97. Lowering of the voltage at the emitter of transistor 97 causes the transistor to conduct thereby lowering the voltage at its collector.

An inverting switch comprising a transistor 106 has its base connected directly to the collector of transistor 97. A source of negative direct current power is connected to the collector of transistor 106 through a resistor 107. A source of positive direct current power is connected directly to the emitter of transistor 106. A clamping diode 108 connected between the base and emitter of transistor 106 prevents the voltage at the base of the transistor from rising above the voltage of the supply connected to the emitter.

As the voltage at the collector of transistor 97 decreases, thereby decreasing the voltage at the base of transistor 106, the voltage at the collector of transistor 106 is raised to the value of the voltage supplied to the emitter of transistor 106. The collector of the transistor 106 may be connected directly with the AND-gate 46 as shown in FIG. 2.

When the voltage at the input on lead 99 returns to a predetermined value the value of voltage from the transistor 94 reaches a value whereby the transistor 96 is returned to its conducting state. Thus the transistor 97 is returned to its non-conducting state thereby causing the voltage at the collector of transistor 106 to return to its former low level.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A waveshape presence detection circuit, comprising: first and second spatially separated wave sampling means; means for propagating a waveshape successively past said first and second sampling means; a peak detector connected to said first sampling means, said peak detector being responsive to the peak of an antinode of said waveshape at said first sampling means to produce an output signal; a threshold circuit connected to said second sampling means, said threshold circuit being adapted to produce an output signal when the amplitude of the waveshape at said second sampling means is above a predetermined level; and means responsive to the simultaneous occurrence of output signals from said peak detector and threshold circuit for producing a waveshape presence signal.

2. A waveshape presence detection circuit, comprising: first and second spatially separated wave sampling means; means for propagating a waveshape successively past said first and second sampling means; a peak detector connected to said first sampling means, said peak detector being responsive to the peak of an antinode of said waveshape at said first sampling means to produce an output signal; a threshold circuit connected to said second sampling means, said threshold circuit being adapted to produce an output signal when the amplitude of the waveshape at said second sampling means is above a predetermined level; a normally enabled AND gate connected to receive the output signals from said peak detector and from said threshold circuit, said gate being operable to produce an output signal in response to the simultaneous occurrence of output signals from said peak detector and threshold circuit; and means responsive to said output signal from said gate for disabling said gate for a predetermined time interval.

3. In a system for reading human language symbols printed on a document comprising: means for scanning each printed symbol on said document and for producing a corresponding distinctive waveshape; wave transmission means for receiving and transmitting each waveshape therealong; a plurality of spaced sampling taps positioned along said transmission means, each sampling tap delivering a signal proportioned to the amplitude of the waveshape thereat; a plurality of waveshape recognition circuits, one for each waveshape to be recognized, connected to said sampling taps, each recognition circuit being operable to produce an output symbol signal in response to a corresponding waveshape in said transmission means; a plurality of normally disabled symbol output signal gating circuits, each gating circuit connected to receive the symbol output signal from a respective one of said recognition circuits, a waveshape presence detection circuit comprising, the combination of: a first circuit connected to receive a signal from at least one of said sampling taps, said first circuit being operable to produce an output signal in response to a predetermined change in the rate of change in amplitude of the received signal; a second circuit connected to receive a signal from at least one of said sampling taps located further along said wave transmission means in the direction of transmission of said waveshape, said second circuit being adapted to produce an output signal when the amplitude of the received signal is above a predetermined level; and means responsive to simultaneous output signals from said first and second circuits for enabling said gating circuits.

4. A system for recognizing the presence of a waveshape of time varying amplitude, comprising: first sensing means for sensing the instantaneous amplitude of said waveshape and for producing a first signal when said amplitude is above a predetermined level; second sensing means for sensing the time rate of change of amplitude of said waveshape and for producing a second signal in response to a predetermined change in said rate of change of amplitude; and means responsive to the simultaneous occurrence of said first and second signals for producing a waveshape presence signal.

5. A system for recognizing the presence of a waveshape of time varying amplitude, comprising: first sensing means for sensing the instantaneous amplitude of said waveshape and for producing a first signal when said amplitude is above a predetermined level; second sensing means for sensing the time rate of change of amplitude of said waveshape and for producing a second signal in response to a predetermined change in said rate of change of amplitude; normally enabled gating means responsive to the simultaneous occurrence of said first and second signals for producing a third signal; means responsive to said third signal for producing a waveshape presence signal; and means responsive to said waveshape presence signal for disabling said gating means.

References Cited by the Examiner

UNITED STATES PATENTS

| 2,482,544 | 9/1949 | Jacobsen | 340—146.3 |
| 3,000,000 | 9/1961 | Eldredge | 340—146.3 |
| 3,103,646 | 9/1963 | Sheaffer | 340—146.3 |

MAYNARD R. WILBUR, *Primary Examiner.*

DARYL W. COOK, MALCOLM A. MORRISON,
*Examiners.*

J. S. IANDIORIO, JAMES E. SMITH,
*Assistant Examiners.*